A. FRIELING.
HORTICULTURAL FORCING HOUSE.
APPLICATION FILED FEB. 17, 1911. RENEWED FEB. 27, 1912.
1,026,576.                                              Patented May 14, 1912.
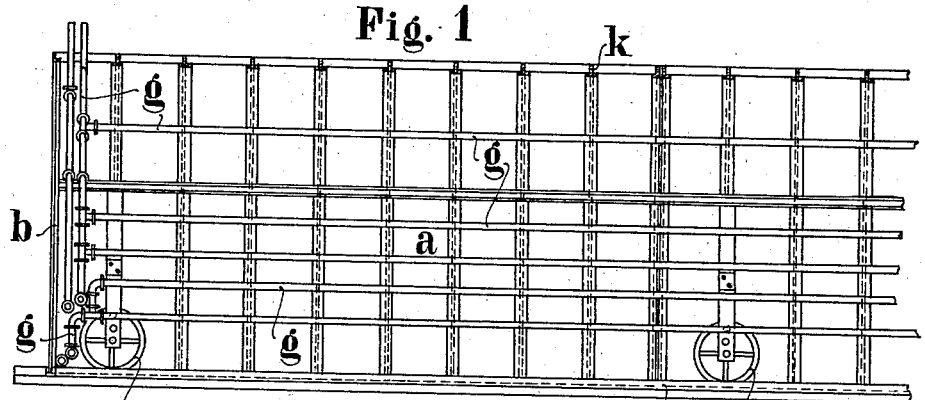
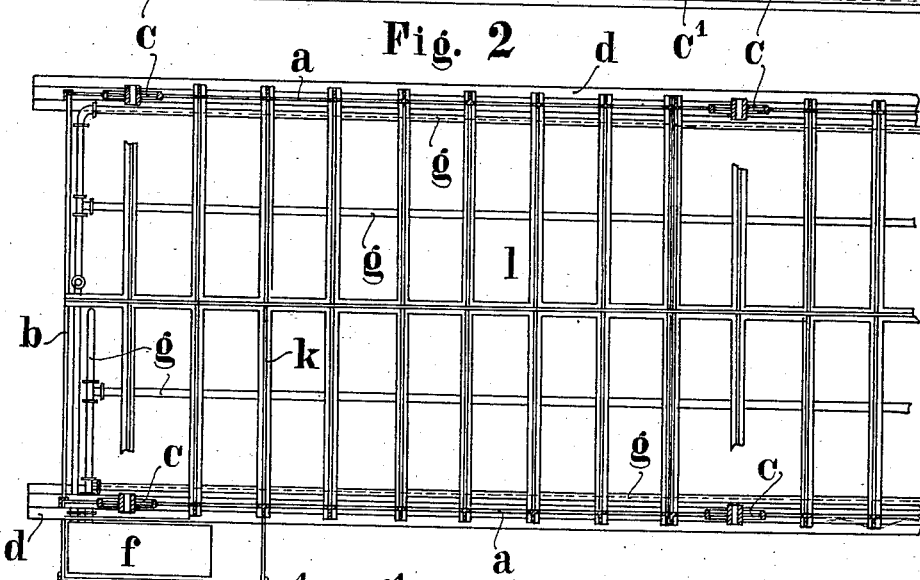
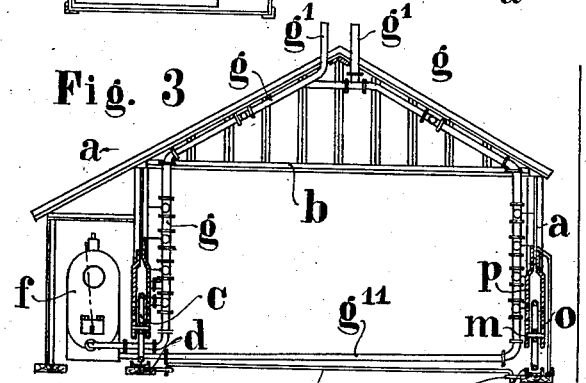
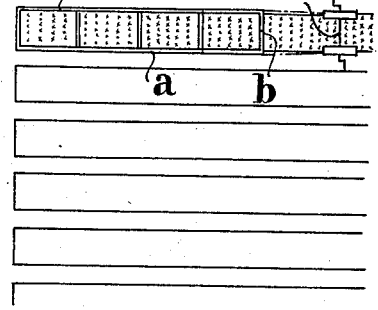
Witnesses.                                              Inventor.
                                                        August Frieling.
                                                    by,             Attorney.

UNITED STATES PATENT OFFICE.

AUGUST FRIELING, OF LANGENFELD, GERMANY.

HORTICULTURAL FORCING-HOUSE.

1,026,576. Specification of Letters Patent. Patented May 14, 1912.

Application filed February 17, 1911, Serial No. 609,173. Renewed February 27, 1912. Serial No. 680,162.

*To all whom it may concern:*

Be it known that I, AUGUST FRIELING, a subject of the German Emperor, residing at Langenfeld, Rhine Province, Germany, have invented certain new and useful Improvements in Horticultural Forcing-Houses, of which the following is a specification.

This invention relates to forcing houses which, while being particularly applicable to the forcing of flowering shrubs, such as syringa, are equally applicable to the forcing of plants generally.

It has already been suggested to construct horticultural forcing houses in such a manner that they may be disassembled and then reërected in another position, so that the blooms of the plants already forced in the one position may be gathered, and the house utilized to force the plants in the other position; whereby a succession of blooms may be obtained.

The time and labor involved in disassembling and reërecting is very considerable. In addition to this the houses, which usually exceed twenty meters in length by five meters in width, have been made from very light materials in order to facilitate this disassembling and reërection, and, consequently, a considerable amount of heat is lost. Further, the wear and tear of the houses subjected to the frequent disassembling and reërection is very great. In addition to the above disadvantages there is also the considerable waste of heat involved in maintaining the house in the one position for a sufficiently long time to insure that the plants which are remote from the heating boiler shall have been fully developed before the house is disassembled. Obviously the plants nearer the furnace are developed first and are often gathered before the plants remote from the furnace have fully matured. The house and its heating apparatus is, therefore, being retained a considerable time in one position unnecessarily.

The object of the present invention is to avoid the above mentioned defects, and it consists in forming the forcing house without any floor, so that it can be placed over a permanent horticultural bed, and also with removable ends so that it can be moved periodically from one position to another on the aforesaid bed, or from one bed to another in a longitudinal series of beds.

The forcing house is preferably provided with wheels adapted to run on rails arranged alongside the bed or series of beds, so as to facilitate its progress when moved from one position to another according to the progress of the cultivation and gathering of the blooms or the like from the plants on the beds, the arrangement rendering the cultivation of plants, such as syringa, or mock orange, much more economical and profitable than at present.

One form of the invention is shown by way of example in the accompanying drawings, in which—

Figure 1 is a side sectional elevation of part of a forcing house, Figs. 2 and 3 are respectively a plan and end sectional elevation corresponding to Fig. 1, and, Fig. 4 is a plan illustrating the application of the forcing house to a horticultural bed or series of beds and means for moving the house from one position to another thereon.

The house is preferably constructed of an iron skeleton or framing $k$, having a glazed roof $l$, and with side walls $a$, which may be partly glazed and partly filled in with wood as usual. The ends $b$, of the house are made removable, so that when the house has been placed over one bed or part of a bed of plants, such as syringa shrubs, and the blooms on said shrubs have been sufficiently developed for gathering, the ends $b$, may be removed and the house moved along the bed without injuring the shrubs. The ends $b$, may be simply hinged, collapsible, or entirely removable, so long as they can be removed from their normal positions sufficiently to allow for the passage of the house over the shrubs on the beds. When large houses are required, for instance a house 25 meters long and 5 meters wide, it can be made in sections, each of about 5 meters in length, so that the sections may be detached from each other.

In order to facilitate the moving of the house from one position to another it is preferably provided with wheels $c$, running on rails $c^1$, secured to wooden planks or sleepers $d$, extending along the sides of the beds. The sleepers $d$, are provided with eyes $d^{10}$ to receive the ends of cross rods $d^{11}$ whereby to retain the tracks in adjusted parallel relation, and at the same time provide convenient means for quickly and conveniently laying or removing the tracks. In order that the level of the house may be maintained on uneven ground, or otherwise adjusted, the wheels $c$, are mounted in an adjustable manner. For example, their axles $m$, are inserted in any pair of a series of holes $o$, in brackets $p$, secured to the structure or framing of the house. In this way either side of the house may be raised or lowered. A hot water boiler $f$, provided with any suitable form of furnace is arranged in a lateral recess at one end of the house. The heating pipes $g$, connected with the boiler in any suitable manner are arranged along the sides of the house and below the glass roof, so that they offer no obstruction when the house is moved over the shrubs on the bed. The highest points of the heating pipes $g$, have vents $g^1$, projecting through the roof of the house. If the return pipe $g^{11}$, of the heating system traverses the house as indicated for instance in Fig. 3, then it is arranged so that it can be easily detached at both ends from the other pipes of the heating system, and does not offer any obstruction to the movement of the house over the bed. When the house is built in sections, for instance, each of about 5 meters in length, then the heating pipes which pass along the sides of the house and beneath the roof are made in corresponding lengths or sections.

In practice the syringa or other plants are ranged in any suitable numbers, side by side, in beds of 180 meters in length and 3 meters in width. The movable forcing house hereinbefore described is mounted at the beginning of the bed, as indicated in Fig. 4. The heating appliance is started and the cultivation or forcing of the plants begins. Obviously, as the interior of the house is hotter nearer the boiler, the plants in proximity thereto are developed earlier than those more remote therefrom; their degree of development usually varying in relation to their distance from the boiler. The blooms from the shrubs nearer the boiler can, therefore, be gathered first. When the gathering is completed over a section of from three to five meters, the ends $b$, of the house are raised or temporarily removed and the house is moved over a suitable distance, for instance, by means of a windlass $h$, Fig. 4. The shrubs from which the blooms or the like have been gathered remain in the open while those which were inside, but remote from the boiler and therefore only partly developed or in bloom are now nearer the source of heat. Fresh shrubs are also brought under the cover of the house. The shrubs which are now nearer the boiler are brought to full bloom in a very short time, the blooms being duly gathered and the house moved on again. The interior of the forcing house is therefore always being fully utilized at its maximum efficiency and the cultivation of the syringa or other plants is rendered much more economical and profitable than hitherto. Moreover, the progressive cultivation carried out in accordance with the invention has a very favorable influence on the plants and blooms are developed of a size and beauty hitherto unobtainable.

Although the invention has been described by way of example as applied to the cultivation of syringa it is applicable for forcing any other plants.

I claim:

A forcing house having a floorless structure, movable end parts on said structure, wheels on which said structure is supported, a lateral chamber on said structure, a heating device in said chamber, circulating pipes from said heating device to the interior of said structure, a plurality of planks adapted to be loosely laid on the ground, rails fixed to said planks, eye plates on said planks and cross tie rods fitting in said eye plates to give a cross bracing for said planks and rails.

In testimony whereof I affix my signature in the presence of two witnesses.

AUGUST FRIELING.

Witnesses:
  LOUIS VANDORY,
  FRANZISKA STADTEN.